United States Patent
Hurst, Jr.

(10) Patent No.: US 6,959,045 B2
(45) Date of Patent: *Oct. 25, 2005

(54) REDUCED COST DECODER USING BITSTREAM EDITING FOR IMAGE CROPPING

(75) Inventor: Robert N. Hurst, Jr., Hopewell, NJ (US)

(73) Assignee: MediaTek, Inc., Hain Chu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 368 days.

(21) Appl. No.: 09/001,199

(22) Filed: Dec. 30, 1997

(65) Prior Publication Data

US 2001/0016009 A1 Aug. 23, 2001

(51) Int. Cl.[7] .................................................. H04N 7/12
(52) U.S. Cl. ................ 375/240.21; 348/387; 348/425.3
(58) Field of Search .................................. 348/387, 390, 348/392, 403, 405, 408, 424, 423, 402, 568, 567, 565, 415, 426, 339.1, 408.1, 420.1, 425.3; 386/68; 382/266, 268, 269; 375/240.21, 240.25, 240.29; 345/521, 684

(56) References Cited

U.S. PATENT DOCUMENTS

| | | | | |
|---|---|---|---|---|
| 5,568,200 A | * | 10/1996 | Pearlstein et al. | .......... 348/426 |
| 5,614,952 A | | 3/1997 | Boyce et al. | ................ 348/392 |
| 5,614,957 A | | 3/1997 | Boyce et al. | ................ 348/567 |
| 5,623,308 A | * | 4/1997 | Civanlar et al. | ............. 348/392 |
| 5,635,985 A | * | 6/1997 | Boyce et al. | ................ 348/402 |
| 5,677,708 A | * | 10/1997 | Matthews, III et al. | ...... 345/684 |
| 5,691,768 A | * | 11/1997 | Civanlar et al. | ............. 348/392 |
| 5,732,248 A | * | 3/1998 | Prouty et al. | ................ 345/521 |
| 5,737,019 A | * | 4/1998 | Kim | ........................... 348/390 |
| 5,867,625 A | * | 2/1999 | McLaren | ...................... 386/68 |

FOREIGN PATENT DOCUMENTS

| | | |
|---|---|---|
| EP | 0 602 621 A | 6/1994 |
| WO | WO 96 06506 | 2/1996 |

* cited by examiner

Primary Examiner—Gims Philippe
(74) Attorney, Agent, or Firm—Andrew D. Fortney

(57) ABSTRACT

A method for decoding variable length encoded digital video data including pictures, to a size less than the full size of the pictures, each picture including a plurality of macroblocks. The method comprises the steps of receiving digital video data; parsing the digital video data to identify macroblocks included in the digital video data; discarding from the digital video data those macroblocks not associated with a picture region substantially corresponding to one of a safe-title picture region and safe-action picture region; and storing the digital video data in a decoder input buffer.

28 Claims, 3 Drawing Sheets

REDUCED COST DECODER USING BITSTREAM EDITING FOR IMAGE CROPPING

The present invention relates to video decoders in general and, more particularly, the invention relates to methods and apparatus for implementing reduced-cost video decoders in a high definition or standard definition television system.

BACKGROUND OF THE DISCLOSURE

Future digital television (DTV) receivers are expected to be implemented substantially in accordance with the transmission standards established by the Advanced Television Standards Committee (ATSC). A similar standard is the European Digital Video Broadcasting (DVB) standard. A compressed digital video system is described in the ATSC digital television standard document A/53, incorporated herein by reference. Moreover, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is incorporated herein by reference.

The new DTV standards allow broadcasters to deliver virtually any format up to 1920×1080 pixels. Specifically, DTV receivers must be capable of receiving source video comprising image sequences that vary in spatial resolution (480 lines, 720 lines, or 1080 lines), in temporal resolution (60 fps, 30 fps, or 24 fps), and in scanning format (2:1 interlaced or progressive scan). Thus, the new DTV standards support either high definition television ("HDTV"), wherein the video frames are of higher resolution than those used in present NTSC signals, or standard definition television ("SDTV"), e.g., television which has approximately the same resolution per frame as the existing analog NTSC standard.

Because of the relatively large amount of data required to represent each frame of a HDTV picture, HDTV decoders must support much higher data rates than SDTV decoders. The additional memory required by a HDTV decoder, as compared to a standard SDTV decoder, and the increased complexity of various circuitry within a HDTV decoder can make a HDTV decoder considerably more expensive than an SDTV decoder.

One prior art technique for reducing memory requirements in a HDTV decoder is identically disclosed in a commonly assigned set of three U.S. patents, namely: U.S. Pat. No. 5,614,952, entitled DIGITAL VIDEO DECODER FOR DECODING DIGITAL HIGH DEFINITION AND/OR DIGITAL STANDARD DEFINITION TELEVISION SIGNALS, issued Mar. 25, 1997; U.S. Pat. No. 5,635,985, entitled LOW COST JOINT HD/SD TELEVISION DECODER METHODS AND APPARATUS, issued Jun. 3, 1987; and U.S. Pat. No. 5,614,957, entitled DIGITAL PICTURE-IN-PICTURE DECODER, issued Mar. 25, 1997. The above three patents [hereinafter the Boyce patents] are herein incorporated by reference in their entirety.

The Boyce patents disclose a series of techniques for reducing the amount of memory required to decode a bitstream including variable length encoded video data. Essentially, high resolution images are decoded at a reduced resolution, thereby requiring less memory to store the images. Moreover, Huffman codes which represent higher-order DCT coefficients are removed form the video stream. Unfortunately, while the Boyce techniques do reduce the total memory and processing requirements of a decoder, the resulting decoder is still quite complex and costly.

Parts of an image to be displayed on a display device, i.e., those regions near the edges of the image, commonly contain information that is not required for enjoyment of the image sequence. This is because of the uncertainty that these portions near the edges will be displayed at all. Such uncertainty is caused by two practices used by many television manufacturers. First, manufacturers may include some amount of "overscan" in their display devices. Second, manufacturers may obscure portions of the picture area near the edges by the use of a display bezel. In recognition of these (and other) practices, the Society of Motion Picture Television Engineers (SMPTE) has adopted a Recommended Practice (RP) 56-1990 which defines a "safe-action" area as the center-most 90% of the image, and a "safe-title" area as the center-most 80% of the image. These portions are linearly determined (i.e., 90% and 80% of vertical and horizontal dimensions).

In view of the above-described SMPTE standard and the need to dramatically reduce system costs in DTV receivers (especially those associated with, e.g., a small display screen), it is seen to be desirable to reduce the video information within an encoded bitstream to correspond to the SMPTE "safe-title" or "safe-action" display sizes.

SUMMARY OF THE INVENTION

The invention relates to video decoders in general and, more particularly, the invention relates to methods and apparatus for implementing reduced-cost video decoders in a high definition or standard definition television system.

Specifically, the invention comprises a method for decoding variable length encoded digital video data including pictures, to a size less than the full size of the pictures, each picture including a plurality of macroblocks. The method comprises the steps of receiving digital video data; parsing the digital video data to identify macroblocks included in the digital video data; discarding from the digital video data those macroblocks not associated with a picture region substantially corresponding to one of a safe-title picture region and safe-action picture region; and storing the digital video data in a decoder input buffer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a video decoder, illustratively an MPEG-2 video decoder, within a digital television (DTV) receiver, illustratively an ATSC television receiver. However, it will be apparent to those skilled in the art that the invention is applicable to any video processing system, including those systems adapted to DVB, MPEG-1 and other information streams.

Figure 1:
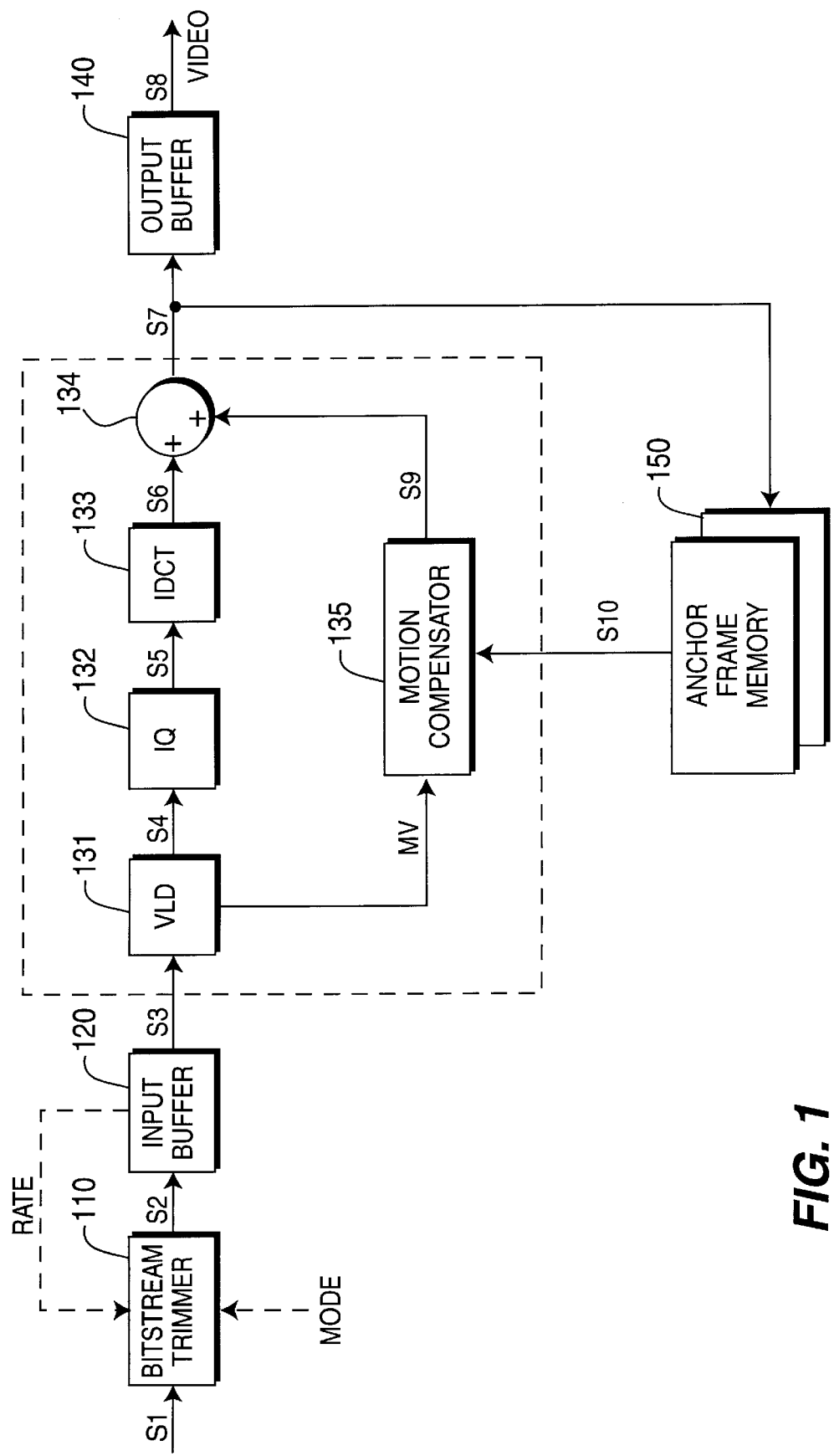
FIG. 1 depicts a high level block diagram of a video decoder according to the invention.

Referring now to FIG. 1, there is illustrated a video decoder generally indicated by the reference number 100, implemented in accordance with one embodiment of the present invention. The illustrated decoder 100 is capable of decoding HD and/or SD television signals, e.g., MPEG compliant television signals. The video decoder 100 comprises a bitstream trimmer 110, a buffer memory 120, a decoder 130, an output buffer 140 and an anchor frame memory 150. The decoder 130 comprises a variable length decoder (VLD) 131, an inverse quantizer (IQ) 122, an inverse discrete cosine transform (IDCT) circuit 133, a summer 134 and a motion compensation circuit 135.

Generally, the single most expensive element of a video decoder, in terms of cost, is the anchor frame memory 150 which may comprise, e.g., 16 MB of synchronous random access memory (RAM) in a HD decoder. The input data buffer 120, which is used for the temporary storage of the compressed bitstream represents a smaller, but not insignificant cost. A fully MPEG compliant HDTV decoder is expected to require at least 1 Mb of RAM for use as a data buffer.

Other elements of a decoder which add significantly to the cost of the decoder are the inverse discrete cosine transform circuit 133 and the inverse quantizer circuit 132. The IDCT circuit 133 of a HDTV decoder is required to perform a large number of arithmetic computations at a high rate and, therefore, is likely to represent a significant portion of a decoder's circuitry. The IQ circuit 132 performs a smaller number of computations than the IDCT circuit 133, but because of the high speed and complexity of the computations the cost of the IQ circuit 122 may also be a significant component of a HDTV decoder's overall cost. In addition, the motion compensation circuit 135 and variable length decoder circuit 131 may require a significant amount of logic gates to implement.

Because the cost and complexity of a HDTV decoder is largely a function of the requirement that it process large amounts of data on a real time basis, it is possible to reduce the complexity and thus the cost of a HDTV compatible decoder by reducing the amount of data that needs to be processed.

The previously mentioned Boyce patents disclose a series of techniques for reducing the amount of memory required to decode a bitstream including variable length encoded video data. The Boyce patents disclose the use of a preparser that reduces the data rate of an encoded video stream by limiting the number of DCT coefficients used to represent each macroblock (e.g., by discarding high-order DCT coefficients). The reduced data rate bitstream is then decoded by a special decoder circuit to produce a reduced resolution video signal.

The bitstream trimmer 110 of the present invention does not selectively reduce the information included in each macroblock. Rather, the bitstream trimmer 110 identifies macroblocks that are not associated with a "safe-title" or, alternatively, "safe-action" portion of a picture per the SMPTE recommended practice 56-1990. The identified macroblocks are discarded, and the resulting data-reduced bitstream is processed by the remaining circuitry within the decoder.

Figure 2:
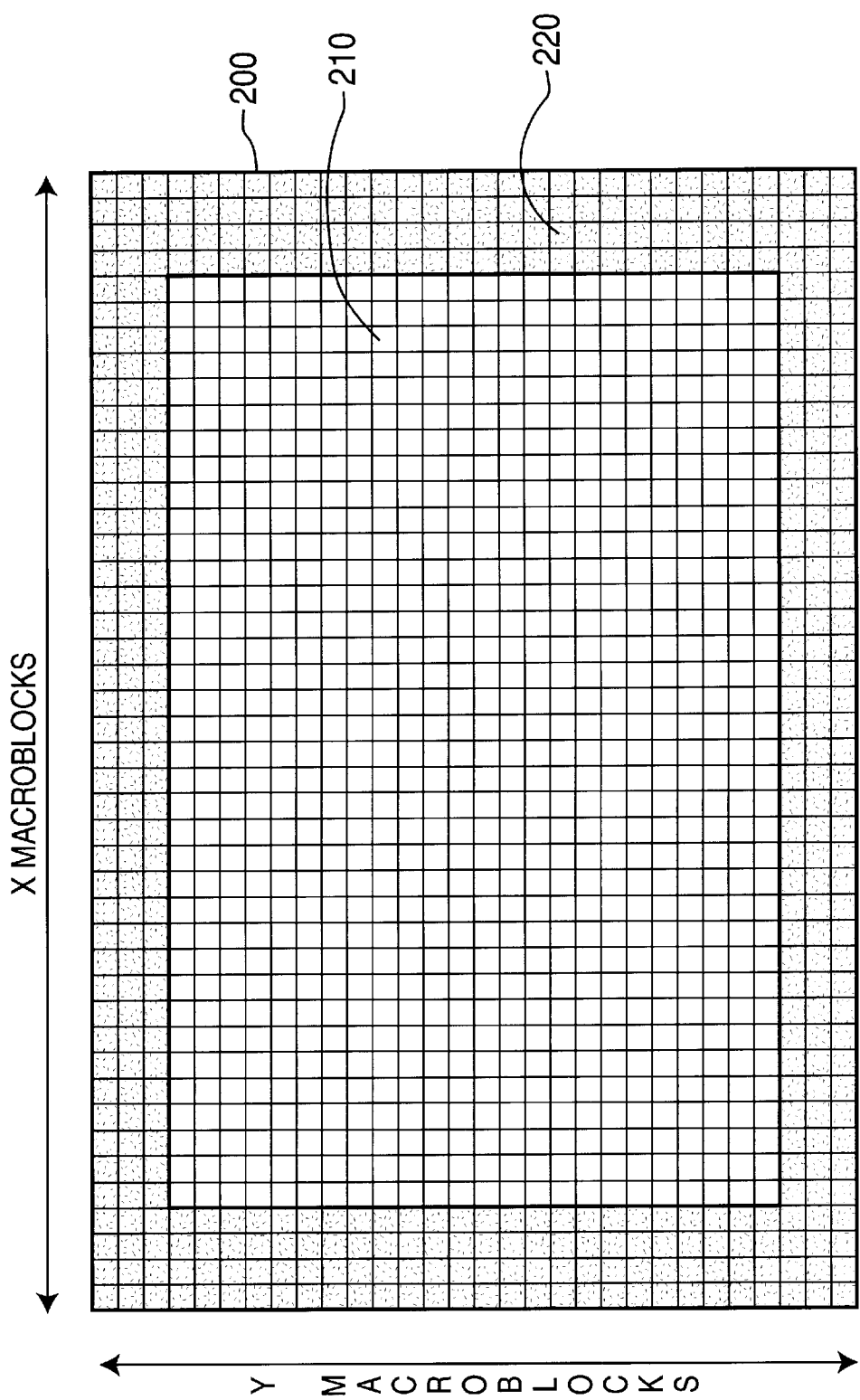
FIG. 2 depicts a representation of a picture produced using the video decoder of FIG. 1.

The visual effect of the bitstream trimmer 110 of the present invention will now be described with respect to FIG. 2, which depicts a representation of a picture produced using the video decoder of FIG. 1. Specifically, FIG. 2 depicts a picture 200 having a horizontal aspect defined by X columns of macroblocks and a vertical aspect defined by Y rows of macroblocks. A first area 210 of picture 200 is the area defined by the SMPTE Recommended Practice 56-1990 as the "safe-title" area (i.e., the center-most 80% of the image). A second area 220 of picture 200 is the area of the picture 200 that is outside of the aforementioned "safe-title" area. The second area 220 of picture 200 is not displayed on a display device because the macroblocks including image information representing this area are discarded by the bitstream trimmer prior to the macroblock decoding circuitry.

The second area may be left as, e.g., a monochromatic border region. In another embodiment of the invention, the first area 210 represents the "safe-action" area (i.e., the center-most 90% of the image), while the second area 220 represents the undisplayed image area. In this embodiment, fewer macroblocks are dropped and, therefore, more memory and processing capability is required that in the case of discarding all but the "safe-title" portion of the picture.

In the case of a 480 line by 704 pixel image generated using 16×16 macroblocks, where each macroblock represents 256 luminance samples, 64 Cb samples and 64 Cr samples, there are typically 44 columns and 30 rows of macroblocks to provide a total of 1320 macroblocks. Thus, to approximately remove all but the center-most 80% of a 480×704 pixel image, the bitstream trimmer 110 removes the three top and bottom rows of macroblocks (i.e., rows 1–3 and 28–30), and the four left and right columns of macroblocks (i.e., columns 1–4 and 42–44).

The invention may, of course be practiced using formats other than the 480×704 format discussed above. Table 1 lists several common video formats, the number of macroblocks in each row and column of a particular format, and the rows and columns to be discarded to reduce the picture size to the safe-area (i.e., 80%) picture size.

TABLE 1

| Format | Rows Of Macro-blocks | Columns Of Macroblocks | Deleted Rows For "Safe-Title" | Deleted Columns For "Safe-Title" |
|---|---|---|---|---|
| 1080 × 1920 | 68 | 120 | 1–5, 64–68 | 1–3, 118–120 |
| 720 × 1280 | 45 | 80 | 1–3, 43–45 | 1–3, 78–80 |
| 480 × 704 | 30 | 44 | 1–3, 42–44 | 1–4, 27–30 |

To identify macroblock rows and columns associated with the "non-safe" picture areas, the bitstream trimmer 110 operates in a variable length decode mode to partially decode the input bitstream. Specifically, the bitstream trimmer 110 parses the picture_data( ) portion of the bitstream to, illustratively, retrieve the so-called macroblock_address_increment and responsively calculate the particular address for each examined macroblock. Those macroblocks having an address associated with the non-safe area are then discarded. it must be noted that the bitstream trimmer 110 does not decode the actual data within the macroblock. The bitstream trimmer 110 only examines the bitstream to identify various start codes and other codes syntactically associated with the desired macroblock positional information.

In one embodiment of the invention, the bitstream trimmer 110 operates in a fixed length mode to only discard rows of macroblocks. Since each row comprises one or more slices (where each slice comprises one or more macroblocks), and the last slice in a row ends at the last column of a row, the bitstream trimmer 110 identifies a particular row by identifying the slice(s) associated with the particular row. Each macroblock within the identified slice(s) is then discarded. Specifically, the bitstream trimmer 110 extracts the so-called slice_vertical_position variable from the picture_data( ) portion of the input bitstream S1. If the slice_vertical_position variable indicates that a particular slice is associated with a non-safe picture area, the particular slice is discarded along with its macroblocks.

In another mode of operation, bitstream trimmer 110 receives a control signal MODE from a controller (not shown) that is indicative of a native display mode of a television receiver. That is, a television receiver may be receiving a high definition video signal, illustratively a 1080×1920 signal, but may only be capable of displaying a standard definition picture, illustratively 480×640. Thus, in the case of a display device having a standard or low definition native operating mode, the bitstream trimmer 110 is used to discard all macroblocks associated with picture information outside of the native mode capabilities of the display device. In this case the memory and processing requirements are designed to support only the native mode of the display device.

In another mode of operation, the bitstream trimmer 110 receives a rate control signal RATE from the input buffer memory 120. The optional rate control signal provides an indication of the utilization level of the buffer memory. To avoid buffer overflow and/or underflow conditions, the bitstream trimmer causes more or less data to be included in the data reduced bitstream S3 by, e.g., responsively discarding more or less macroblocks or by stripping away or adding padding information to the bitstream. The padding information may be specific, non-MPEG codes that are used to increase the amount of data within the data reduced bitstream S3. if too much data is present in data reduced bitstream S3, the padding information is not inserted by the bitstream trimmer 110.

In still another embodiment of the invention, the input of input buffer 120 is coupled to receive the input bitstream S1 directly, the input of bitstream trimmer 110 is coupled to the output of input buffer 120, and the output of bitstream trimmer 110 is coupled to the input of video decoder 130. In this embodiment, since the bitstream trimmer 110 is located after the input buffer 120, a normal (i.e., non-reduced) input buffer memory is required. However, this embodiment may be suitable for systems in which a normal size input buffer 120 is required anyway (e.g., the output of the input buffer 120 is utilized by several decoders, some of which must have non-reduced bitstreams).

The above-described operation of bitstream trimmer 110 will result in a reduced size picture, though the resolution of the displayed portion of the picture (i.e., pixel density) will remain unchanged. The operation of bitstream trimmer 110 will dynamically limit the amount of video data supplied to the remaining elements of the video decoder circuit 100, including the VLD circuit 120, thereby reducing the amount of data that must be processed by the subsequent circuit elements on a real time basis, and the required complexity of those circuit elements. An additional benefit of the use of the bitstream trimmer 110 is that it permits for the use of a smaller input buffer 120 than would otherwise be required.

Returning now to FIG. 1, the bitstream trimmer 110 receives a variable length encoded bitstream S1 representing, e.g., a high definition television signal output from a transport demultiplexer/decoder circuit (not shown). The bitstream trimmer 110 parses the incoming bitstream S1, without performing a complete variable length decode operation, to identify data corresponding to different types of video frames, such as bi-directionally coded ("B") frames, predictively coded video frames ("P") frames and intra-coded ("I") frames. The bitstream trimmer 110 then identifies and discards macroblocks within the identified frames corresponding to picture information outside of a preferenced picture area, as previously described, to produce a reduced data bitstream S2 that is coupled to the input buffer memory 120. The input buffer memory 120 is used to temporarily store the variable length encoded data output by the bitstream trimmer 110 until the variable length decoder 131 is ready to accept the video data for processing. The VLD 131 has an input coupled to a data output of the input buffer memory 120 to retrieve the stored variable length encoded video data as data stream S3.

The VLD 131 decodes the retrieved data to produce a constant length bit stream S4 comprising quantized prediction error DCT coefficients, and a motion vector stream MV. The IQ circuit 132 performs an inverse quantization operation upon stream S3 to produce a stream S5 comprising quantized prediction error coefficients in standard form. The IDCT circuit performs an inverse discrete cosine transform operation upon stream S5 to produce a stream S6 comprising pixel-by-pixel prediction errors (degraded by quantization).

The summer 134 adds the pixel-by-pixel prediction error stream S6 to a motion compensated predicted pixel value stream S9 produced by the motion compensator 135. The output of summer 134 is a video stream S8 comprising reconstructed pixel values (degraded by quantization) that is coupled to the anchor frame memory 136 and to video processing circuitry (not shown) for further processing and/or display. The anchor frame memory is accessed by the motion compensator 135 via signal path S10. The motion compensator utilizes one or more stored anchor frames (e.g., the last frame of video produced at the output of the summer 134), and the motion vector signal MV received from the VLD 131, to calculate the values for the motion compensated predicted pixel value stream S9.

By using the bitstream trimmer 110 in the above described manner, the computation requirements of the VLD circuit 120 are substantially reduced as compared to the case where all the received data is syntax parsed and variable length decoded. The bitstream trimmer 110 effectively limits the number of DCT coefficients which must be variable length decoded by discarding macroblocks.

Figure 3:
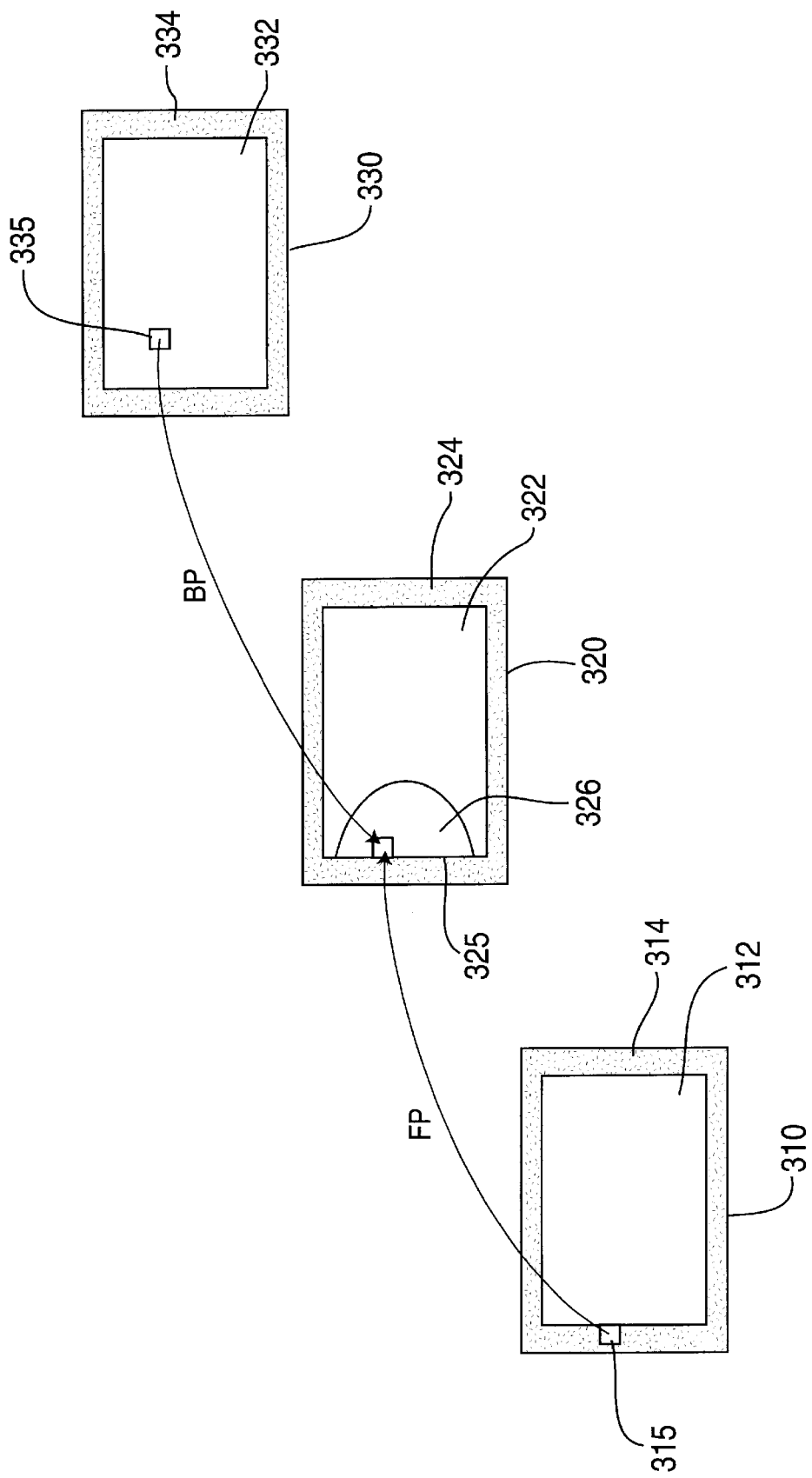

FIG. 3 depicts a representation of motion vector usage according to the invention. Specifically, FIG. 3 depicts three related video frames (i.e., pictures), namely a first video frame 310, a second video frame 320, and a third video frame 330. The frames are temporally related, in that frames 310, 320 and 330 are displayed as respective first, second and third frames within a sequence of video frames. The first video frame 310 comprises a safe title area 312 and a non-displayed area 314. Similarly, the second video frame 320 comprises of a safe title area 322 and a non-displayed area 324; and third video frame 330 comprises a safe title area 332 and non-displayed area 334. Macroblocks within the non-displayed area (i.e. areas 314, 324 and 334) are discarded as previously discussed.

FIG. 3 also depicts macroblocks 315, 325 and 335 within respective video frames 310, 320 and 330. The three macroblocks represent a left to right motion of, e.g., an object within respective macroblocks 315, 325 and 335. Macroblock 315 includes forward predictive information FP that is used to produce macroblock 325. Similarly, macroblock 335 includes backward predictive information BP that is used to produce macroblock 325 (assuming that video frame 320 is a B-frame).

Unfortunately, macroblock 315 is within the non-displayed area of picture 310 (i.e., macroblock 315 has been discarded prior to the decoding of picture 310 and, therefore, the forward predictive information FP within macroblock 315 has been lost. By contrast, macroblock 335 of picture 330 is within the displayed area 322, thus the backward predictive information BP within macroblock 335 is available. Therefore, in the case of picture 320 being a B-Frame, macroblock 325 only uses predictive information from macroblock 335.

In one embodiment of the invention, the case of picture 320 comprising a P-Frame is handled by simply ignoring the prediction information. That is, macroblocks that utilize predictive information derived from non-displayed (i.e., discarded) macroblocks are simply not updated with this information. This may be accomplished by, e.g., setting the predictive motion vectors associated with a discarded macroblock to zero.

In another embodiment of the invention, a sampling of the motion vector prediction information utilized for macroblock surrounding a macro block, i.e., macroblocks within the region of picture 320 denoted as 326, are used to create an average prediction estimation which may be utilized to produce macroblock 325.

In still another embodiment of the invention, pixels that are normally predicted using discarded macroblock information are simply not displayed (e.g., changed to black).

The preferred approach is the use of a regional prediction (i.e., an average of region 326 to predict macroblock 325). Thus, in the case of forward prediction information FP for macroblock 326 having been discarded, the macroblocks comprising a portion of the surrounding macroblocks (e.g., region 326) of video frame 320 are sampled, and an average forward prediction parameter AFP is calculated. The AFP is utilized by the decoder to help construct macroblock 325. Similarly, in the case of backward prediction information BP for macroblock 326 having been discarded, the macroblocks comprising a portion of the surrounding macroblocks (e.g., region 326) of video frame 320 are sampled, and an average backward prediction parameter ABP is calculated. The ABP is utilized by the decoder to help construct macroblock 325.

In another embodiment of the invention, the spatial displacement of the non-discarded macroblock to the macroblock to be predicted is used to determine an appropriate sampling region and sample weighting. Similarly, the spatial displacement of a region surrounding the non-discarded macroblock may be compared to the spatial displacement or temporal displacement) of a region surrounding the macroblock to be predicted may be used to further refine the appropriate sampling region and sample weighting.

Although various embodiments which incorporate the teachings of the present invention have been shown and described in detail herein, those skilled in the art can readily devise many other varied embodiments that still incorporate these teachings.

What is claimed is:

1. A method for decoding variable length encoded digital video data including pictures, to a size less than the full size of the pictures, each picture including a plurality of macroblocks, the method comprising the steps of:
   parsing the digital video data to identify macroblocks included in the digital video data;
   discarding from the digital video data those macroblocks not associated with a picture region substantially corresponding to one of a safe-title picture region and safe-action picture region; and
   storing the digital video data in a decoder input buffer, said digital video data stored in said decoder buffer including fewer macroblocks per picture than identified during said step of parsing.

2. The method of claim 1, wherein:
   said step of parsing comprises the step of extracting, from the digital video data, one of a macroblock address indicium and a slice position indicium; and
   said step of discarding comprises the step of discarding macroblocks associated with a predetermined macroblock address indicium or a predetermined slice position indicium.

3. The method of claim 1, further comprising the step of:
   identifying non-discarded macroblocks that utilize predictive information associated with discarded macroblocks; and
   in the case of said identified non-discarded macroblocks additionally utilizing predictive information associated with non-discarded macroblocks, utilizing only said prediction information associated with non-discarded macroblocks to form said identified non-discarded macroblocks.

4. The method of claim 3, wherein:
   in the case of said identified non-discarded macroblocks utilizing only predictive information associated with non-discarded macroblocks, performing the steps of:
   identifying, for each identified non-discarded macroblock, a respective proximately displayed macroblock region;
   utilizing, for each identified non-discarded macroblock, said respective proximately displayed macroblock region to estimate a respective regional motion compensation parameter; and
   calculating, for each identified non-discarded macroblock, a motion compensation parameter utilizing said respective regional motion compensation parameter.

5. The method of claim 1, further comprising the step of:
   identifying non-discarded macroblocks that utilize predictive information associated with discarded macroblocks;
   identifying, for each identified non-discarded macroblock, a respective proximately displayed macroblock region;
   utilizing, for each identified non-discarded macroblock, said respective proximately displayed macroblock region to estimate a respective regional motion compensation parameter; and
   calculating, for each identified non-discarded macroblock, a motion compensation parameter utilizing said respective regional motion compensation parameter.

6. An apparatus for use in a system for decoding variable length encoded digital video data including pictures, to a size less than the full size of the pictures, each picture including a plurality of macroblocks, the apparatus comprising:
   a bitstream trimmer, for parsing the digital video data to identify macroblocks included in the digital video data, and for discarding from the digital video data those macroblocks not associated with a predefined picture region to produce data reduced encoded digital video data, said data reduced encoded digital video data including fewer macroblocks per picture than present in said digital video data; and a video decoder, coupled to said bitstream trimmer, for decoding said data reduced encoded digital video data to produce a video signal.

7. The apparatus of claim 6, further comprising:
a buffer memory, coupled to said bitstream trimmer and said video decoder, for buffering said data reduced encoded digital video data prior to said data reduced encoded digital video data being decoded by said decoder.

8. The apparatus of claim 7, wherein said bitstream trimmer, in response to a rate control signal, responsively modifies a data rate parameter of said data reduced encoded digital video data.

9. The apparatus of claim 8, wherein rate control signal is generated by said buffer memory and is indicative of a level of memory utilization within said buffer memory.

10. The apparatus of claim 6, wherein said bitstream trimmer, in response to a display mode indicium signal, responsively discards macroblocks associated with picture areas not relevant to said indicated display mode.

11. The apparatus of claim 6, wherein:
said video decoder includes a motion compensator responsive to motion predictive information included within said digital video data.

12. The apparatus of claim 11, wherein:
said motion compensator, in the case of a macroblock utilizing motion predictive information from a discarded macroblock, estimates said discarded motion compensation information.

13. The apparatus of claim 12, wherein:
said motion compensator estimates said motion compensation information by utilizing an average motion estimation of a macroblock region proximate to said macroblock requiring said motion compensation information.

14. The apparatus of claim 13, wherein:
said macroblock region comprises a region calculated using at least one of a predetermined spatial displacement parameter, and a predetermined temporal parameter.

15. A method for decoding variable length encoded digital video data including pictures, to a size less than the full size of the pictures, each picture including a plurality of macroblocks, the method comprising the steps of:
parsing the digital video data to identify macroblocks included in the digital video data;
discarding from the digital video data only those macroblocks not associated with a picture region substantially corresponding to one of a safe-title picture region and safe-action picture region; and
storing the digital video data in a decoder input buffer.

16. The method of claim 15, wherein:
said step of parsing comprises the step of extracting, from the digital video data, one of a macroblock address indicium and a slice position indicium; and
said step of discarding comprises the step of discarding macroblocks associated with a predetermined macroblock address indicium or a predetermined slice position indicium.

17. The method of claim 15, further comprising the step of:
identifying non-discarded macroblocks that utilize predictive information associated with discarded macroblocks; and
in the case of said identified non-discarded macroblocks additionally utilizing predictive information associated with non-discarded macroblocks, utilizing only said prediction information associated with non-discarded macroblocks to form said identified non-discarded macroblocks.

18. The method of claim 17, wherein:
in the case of said identified non-discarded macroblocks utilizing only predictive information associated with non-discarded macroblocks, performing the steps of:
identifying, for each identified non-discarded macroblock, a respective proximately displayed macroblock region;
utilizing, for each identified non-discarded macroblock, said respective proximately displayed macroblock region to estimate a respective regional motion compensation parameter; and
calculating, for each identified non-discarded macroblock, a motion compensation parameter utilizing said respective regional motion compensation parameter.

19. The method of claim 15, further comprising the step of:
identifying non-discarded macroblocks that utilize predictive information associated with discarded macroblocks;
identifying, for each identified non-discarded macroblock, a respective proximately displayed macroblock region;
utilizing, for each identified non-discarded macroblock, said respective proximately displayed macroblock region to estimate a respective regional motion compensation parameter; and
calculating, for each identified non-discarded macroblock, a motion compensation parameter utilizing said respective regional motion compensation parameter.

20. An apparatus for use in a system for decoding variable length encoded digital video data including pictures, to a size less than the full size of the pictures, each picture including a plurality of macroblocks, the apparatus comprising:
a bitstream trimmer, for parsing the digital video data to identify macroblocks included in the digital video data, and for discarding from the digital video data only those macroblocks not associated with a predefined picture region to produce data reduced encoded digital video data; and
a video decoder, coupled to said bitstream trimmer, for decoding said data reduced encoded digital video data to produce a video signal.

21. The apparatus of claim 20, further comprising:
a buffer memory, coupled to said bitstream trimmer and said video decoder, for buffering said data reduced encoded digital video data prior to said data reduced encoded digital video data being decoded by said decoder.

22. The apparatus of claim 21, wherein said bitstream trimmer, in response to a rate control signal, responsively modifies a data rate parameter of said data reduced encoded digital video data.

23. The apparatus of claim 22, wherein rate control signal is generated by said buffer memory and is indicative of a level of memory utilization within said buffer memory.

24. The apparatus of claim 20, wherein said bitstream trimmer, in response to a display mode indicium signal, responsively discards macroblocks associated with picture areas not relevant to said indicated display mode.

25. The apparatus of claim 20, wherein:
said video decoder includes a motion compensator responsive to motion predictive information included within said digital video data.

26. The apparatus of claim 25, wherein:
said motion compensator, in the case of a macroblock utilizing motion predictive information from a discarded macroblock, estimates said discarded motion compensation information.

27. The apparatus of claim 26, wherein:
said motion compensator estimates said motion compensation information by utilizing an average motion estimation of a macroblock region proximate to said macroblock requiring said motion compensation information.

28. The apparatus of claim 27, wherein:
said macroblock region comprises a region calculated using at least one of a predetermined spatial displacement parameter, and a predetermined temporal parameter.

\* \* \* \* \*